United States Patent [19]
Volz

[11] Patent Number: 5,988,770
[45] Date of Patent: Nov. 23, 1999

[54] ELECTROMAGNETICALLY CONTROLLED ASSEMBLY

[75] Inventor: Peter Volz, Darmstadt, Germany

[73] Assignee: ITT Manufacturing Enterprises Inc., Wilmington, Del.

[21] Appl. No.: 08/765,018

[22] PCT Filed: Jun. 20, 1995

[86] PCT No.: PCT/EP95/02377

§ 371 Date: Mar. 25, 1997

§ 102(e) Date: Mar. 25, 1997

[87] PCT Pub. No.: WO96/00670

PCT Pub. Date: Jan. 11, 1996

[30] Foreign Application Priority Data

Jun. 28, 1994 [DE] Germany .............................. 44 22 491

[51] Int. Cl.⁶ ....................................................... B60T 8/36
[52] U.S. Cl. ................... 303/119.3; 303/DIG. 10
[58] Field of Search ............................. 303/112.1, 116.4, 303/119.2, 119.3, DIG. 10; 361/622, 796, 807; 174/525; 137/884; 251/129.02, 129.07, 129.05

[56] References Cited

U.S. PATENT DOCUMENTS

| | | | |
|---|---|---|---|
| 5,362,137 | 11/1994 | Kohno | 303/119.3 |
| 5,386,337 | 1/1995 | Schoettl | 361/622 |
| 5,462,344 | 10/1995 | Jakob et al. | 303/119.3 |
| 5,634,695 | 6/1997 | Ohta et al. | 303/116.4 |
| 5,662,392 | 9/1997 | Hinz | 303/119.2 |

FOREIGN PATENT DOCUMENTS 4232205  3/1994  Germany .

*Primary Examiner*—Matthew C. Graham
*Attorney, Agent, or Firm*—Rader, Fishman & Grauer PLLC

[57] ABSTRACT

Electromagnetically controlled assembly, including electromagnetically operable solenoid valves which are mounted on a valve accommodating member, coils having electric contact elements on their parts projecting from the valve accommodating member, a cover unit which covers the coils and the contact elements, a carrier element to accommodate the coils which is incorporated in the cover unit, at least a part of the cover unit being adapted to accommodate an electronic controller or connecting elements for an electronic controller. The carrier element is made of a material conducting the magnetic flux and the thermal flux, and a plurality of parts conducting the magnetic flux and the thermal flux are mounted at least on one of the bottom side and the top side of the plate-shaped carrier element.

8 Claims, 3 Drawing Sheets

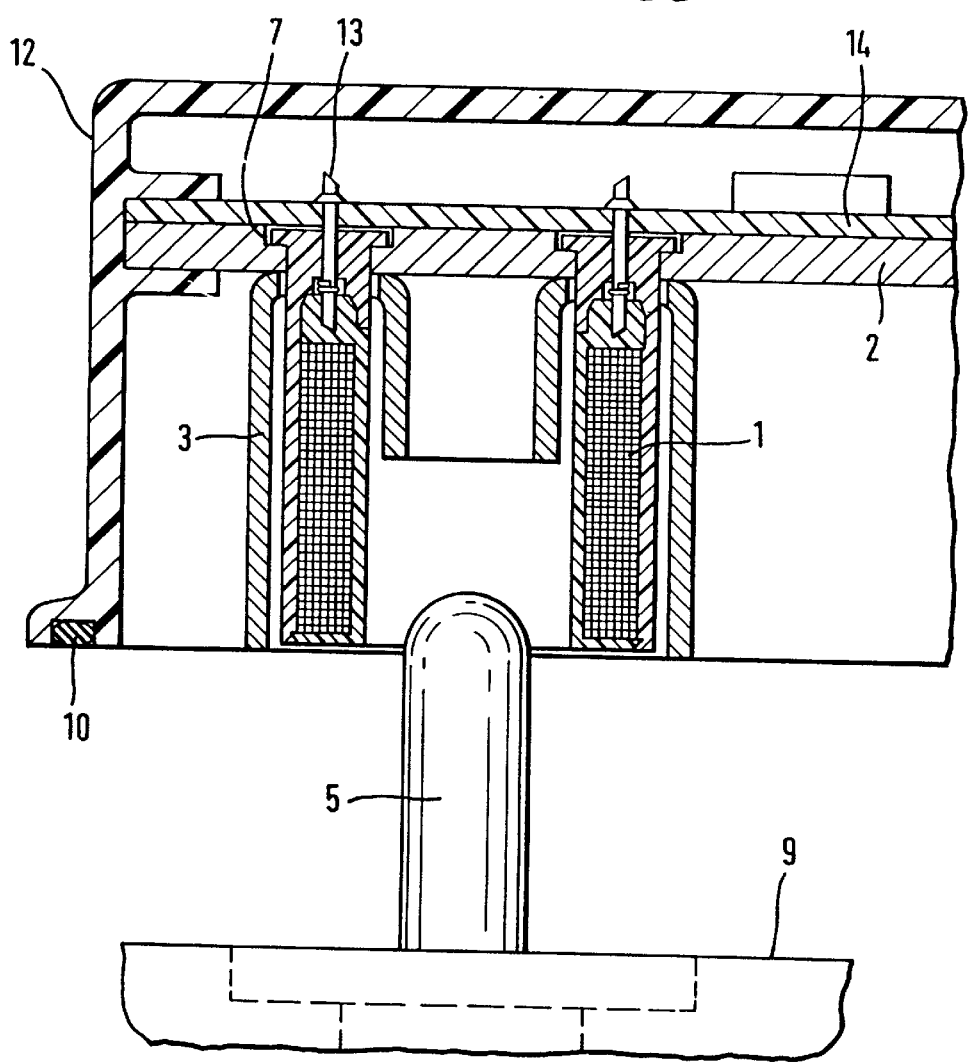

ELECTROMAGNETICALLY CONTROLLED ASSEMBLY

BACKGROUND OF THE INVENTION

The present invention relates to an electromagnetically controlled assembly, in particular for a braking pressure control device.

A generic electrohydraulic pressure control device is disclosed, for example, in international publication WO 92/12878 wherein in addition to the sufficiently known modular construction of the valve accommodating member, the cover is subdivided by a plate-shaped carrier element. On the one hand, this permits accommodation of an electronic controller or parts for an electronic controller. On the other hand, this permits providing the electric connection between the electronic controller and the contact elements which project from the solenoid valves. The cover along with the coils of the solenoid valves is slipped onto the valve domes of the valve accommodating member, and plug contacts engage each other to provide the electrical contact between the contact elements and the electronic or electric components integrated in the cover. The prior art publication teaches using elastic mounting elements, such as springs, to fasten the coils on the carrier element, or embedding the coils in an elastic shaped member. The functional arrangement of the coils in consideration of mounting conditions is provided as a complex.

In the generic publication WO,A,92/08630, the yoke ring, as an integral sleeve member, is connected with the tubular member of a valve coil for the electromagnetic actuation of a hydraulic valve.

The valve coil extends with its contact pins through an intermediate wall of a cover-shaped housing up to a conducting foil placed on an aluminum plate. The intermediate wall is provided as a carrier element. Each valve coil is fixed to the carrier element by way of elastic sealing plugs which embrace the contact pins and extend until the opening area of the aluminum plate placed on the carrier element. The heat which is produced during operation of the valve coil can be transmitted to the valve accommodating member at most by way of the tubular member. The aluminum plate can act as a heat reducing element exclusively for electric construction elements which are directly mounted on the aluminum plate. The elastic sealing plugs on the tubular members of the hydraulic valves act as heat insulators for the valve coils. The quality of the magnetic circuit mainly depends on the exact fit of the sleeve member in the tubular member on the valve dome.

SUMMARY OF THE INVENTION

An object of the present invention is to provide an improved pressure control device compared to the state of the art mentioned in order to achieve a simple positioning of the coils and a compact and functionally optimized arrangement of the coils with respect to the carrier element, which is easy to manufacture and to test. Further, operational temperatures and heat expansions of the components should be absorbed to the greatest possible extent by the carrier element, and the magnetic circuit of the coils should be configured as optimal as possible.

According to the present invention, this object is achieved by the characterising features described hereinbelow.

A particularly simple accommodation of the coil in the sleeve is achieved when the sleeve is configured as a tubular member which encompasses the coil. This produces a closed magnetic circuit, without a by-pass, between the valve dome and the valve accommodating member.

According to another aspect of the present invention, the annular member can be configured as an annular part which is movable into abutment on the carrier element, separately of the sleeve, so that the magnetic circuit is closed by way of the carrier element. This renders it possible to align and/or attach the annular member and the sleeve as desired.

The arrangement may include attaching the tubular member on the carrier element by operative and/or positive engagement. The sleeve may be aligned in relation to the valve dome separately of the tubular member to achieve a simple centering action.

The sleeve is suitably shaped as a bowl having its open end plugged over the valve dome. The result is that the sleeve does not require complicated arrangements to be aligned and, in addition, the shape of the sleeve improves the magnetic flux to the carrier element.

An almost loss-free magnetic circuit is achieved because no clearance is required between the valve dome and the sleeve for the radial displaceability of the sleeve relative to the coil.

A heat conducting foil may be arranged on the top side of the carrier element. Electric and electronic components can be mounted on the heat conducting foil to reduce the operational temperature of the components by an improved heat transfer to the carrier element.

Further features, advantages and possible applications of the present invention can be seen in the following description of several embodiments.

BRIEF DESCRIPTION OF THE DRAWING

In the drawings,

FIG. 3 is another embodiment of the sleeve for the simplified attachment and improvement of the magnetic flux inside the pressure control device.

FIG. 4 is another embodiment of the housing of the pressure control device with a modified sleeve design.

DETAILED DESCRIPTION OF THE INVENTION

Figure 1:
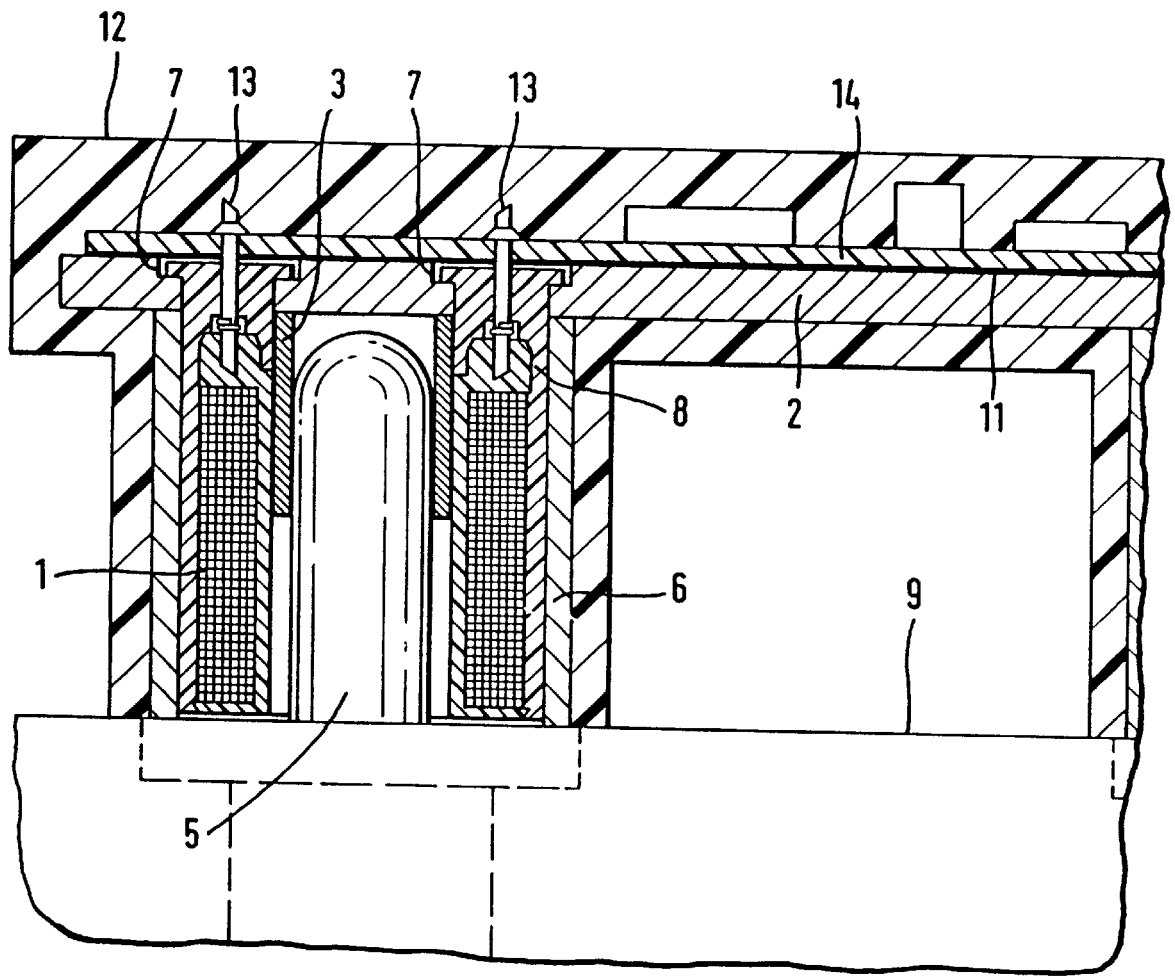
FIG. 1 is a longitudinal partial cross-sectional view of the pressure control device according to the present invention.

FIG. 1 shows a lateral view of the pressure control device according to the present invention in which the basic components are sketched. The left-hand portion of the pressure control device includes a housing 12, shown in a profiled section, which encloses a carrier element 2 having a conducting path 14. Beneath the carrier element 2, the housing 12 accommodates one of several coils 1 of the solenoid valves which are preferably retained in one or more rows in the housing 12. Housing 12 is made of a plastic spraying compound and serves to accommodate and seal the individual electric and electronic components of the pressure control device. To accommodate the contact elements 13 which project from the coils 1, the carrier element 2 has a plurality of through-bores 7 which are filled by a sealing compound. The carrier element 2 is configured as a steel plate which is substantially horizontally seated on top of the coils 1 and includes on its bottom side a plurality of tubular members 6 and sleeves 3. The coils 1, which are encompassed by insulating material each, are mounted on a coil form 8 which is also made of plastics. Alternatively, the coil 1 may be made by sintering, thereby obviating the need for a coil form 8 as a coil base member. The tubular members 6 and the sleeves 3 are made of steel and welded to the bottom side of the carrier element 2. Preferably, the block-shaped valve accommodating member 9 is made of light metal. Several valve domes 5 which are part of valve cartridges of the hydraulic valves project from the valve accommodating member 9. The valve cartridge and the valve dome 5 are also made of steel so that the magnetic circuit is closed by way of the above-mentioned steel parts when the coil 1 is energized. Coils 1, which are mounted on the carrier element 2 between the sleeves 3 and the tubular members 6, are fixed on the valve domes 5 arranged in parallel rows (not shown explicitly). The carrier element 2 functions as a connecting plate closing the magnetic flux, and functions as a heat-reducing element, especially for the electric components arranged on top of the carrier plate. The components are shown as a conducting path 14 equipped with electronic parts. An adhesive heat conducting foil 11 is interposed between the conducting path 14 and the carrier element 2 to improve the thermal flux. Advantageously, the entire assembly group is spray-coated with the plastic material of the housing 12 in one casting. This produces a corrosion-resistant electric unit which is optimized with respect to the mounting space and the magnetic flux and can be mounted on the hydraulic or pneumatic assembly unit (hydraulic or pneumatic valves) incorporated in the valve accommodating member 9 in conformity with the demands of automation.

Figure 2:
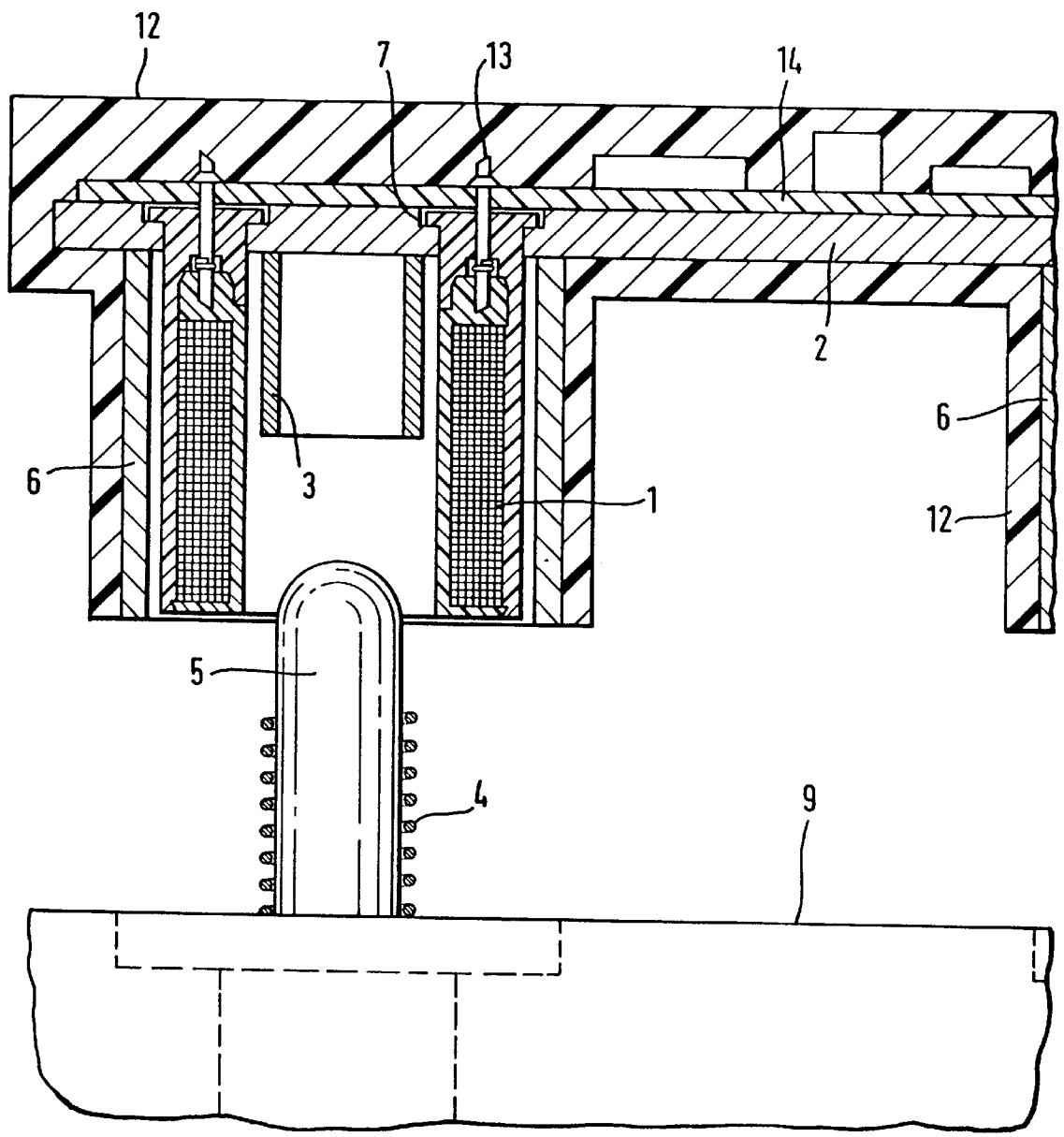
FIG. 2 is an alternative arrangement of the sleeve in a construction variant of the pressure control device of FIG. 1.

Different from FIG. 1, FIG. 2 shows the sleeve 3 loaded by a compression spring 4. Sleeve 3 has a generously dimensioned radial air gap with respect to the coil 1. The air gap permits mounting the coil 1 on the valve dome 5 irrespective of component tolerances and alignment errors. Vertical component tolerances are compensated for by the effect of the compression spring 4 which, due to its effect on the sleeve 3, ensures a proper contact between the sleeve 3 and the carrier element 2. Also, the circuit is always closed by the tight fit of the sleeve 3 on the valve dome 5, with generously selectable radial component tolerances. Thus, the magnetic circuit between the valve accommodating member 9, the tubular member 6, the carrier element 2, the sleeve 3 and, via the valve dome 5, the magnetic core (not shown) inside the valve dome 5 is always closed by the inventive arrangement of a spring-loaded sleeve 3 on the valve dome 5 in spite of a relatively large radial clearance between the sleeve 3 and the coil 1. Due to the arrangement of the single parts according to the present invention, magnetic losses are negligibly small. The tubular member 6 is also preferably welded to the carrier element (as described in FIG. 1), and a floating support for the alignment of the sleeve 3 is produced by the effect of the compression spring 4 on the carrier element 2. Not only welding methods, but also soldering and clamping methods are appropriate to fasten the tubular member 6 to the carrier element 2. Further, it is possible that the tubular member is initially applied loosely on the carrier element 2 and is subsequently fixed to the carrier element 2 during the action of spray-coating the entire electronic unit with plastic material. Because the tubular member 6 as well as the sleeve 3 are made of steel and contact the carrier element 2 directly, a proper heat transfer from the coil 1 to the steel-made carrier element 2 is ensured, and the on-times of the coil 1 may be extended, if necessary, without the risk of overheating. With the exception of further details which have already been explicitly referred to in FIG. 1, the design of the pressure control device of FIG. 2 is largely identical to FIG. 1.

Different from the pressure control device of FIG. 1 and FIG. 2, the sleeve 3 is configured as a bowl-shaped element in FIG. 3. The bowl bottom is in contact with the carrier element 2. After being inserted on the valve dome 5, the edge of the bowl encloses the valve dome in sections. This provides a simple fixation of the sleeve 3 on the valve dome 5 which is assisted by the application of clip-shaped elements on the bowl edge or on the valve dome. The large contact surface of the bowl bottom, which additionally abuts on the carrier element 2, improves the magnetic flux, and the minimal play (clearance) between the valve dome 5 and the sleeve 3 minimizes magnetic losses. This achieves an optimal magnetic flux with least mounting space and assembling effort necessary. If required, this permits better utilizing the larger mounting space which is now available for the coil 1 in order to optimize the coil 1. The relatively large abutment surface of the bowl bottom on the carrier element 2, further, provides a better heat transfer from the solenoid valve to the carrier element 2. FIG. 3 shows only variants of the present invention with respect to FIG. 1 and FIG. 2 so that the drawings and parts of the description of FIGS. 1 and 2 are referred to regarding further necessary details of the pressure control device.

Different from the previous design variants, FIG. 4 shows a sleeve 3 formed to achieve a coil form housing. Sleeve 3, configured as a thin, cap-shaped yoke ring, extends floatingly over the coil 1 from inwards in an outward direction. The air gap between the coil 1 and the largely closed sleeve 3 is dimensioned such that the distances which are necessary due to component tolerances can be compensated for during the assembly of the electronic unit (housing 12) on the hydraulic or pneumatic unit (valve accommodating member 9). Thus, as has been explained in the preceding embodiments, the sleeve 3 can be centered on the valve dome 5 without causing torsion or damage to the coil 1 and the contact elements 13 which would be due to the possibly necessary radial displacement. Preferably, each contact element 13 of the coil 1 is cast with a plastic compound in the large-dimensioned through-bore 7 of the carrier element 2, thereby preventing the ingress of moisture into the space of the coil 1. The housing 12 of the pressure control device is typically made of a frame-shaped plastic part which is mounted on the valve accommodating member 9 by way of a seal 10 and forms the hollow space of a cover in the area of the conducting path 14 which accommodates the electric components. If necessary, the cover hollow space is filled with a corrosion-resistant compound. As described in FIG. 1, a heat conducting foil is interposed between the carrier element 2 and the conducting path 14, if required. Due to the virtually closed shape of sleeve 3, sleeve 3 in its capacity as a coil cap closing the magnetic circuit, permits an uninterrupted magnetic flux and a large heat transmission surface between the carrier element 2 and the coil 1.

The following advantages may be achieved by the above-mentioned embodiments of the present invention:

1. economy of expensive carrier elements which would increase the mounting space,
2. optimal use of space between the valve domes and the electronics,
3. optimal magnetic flux between the necessary components of the solenoid valves due to resulting additional mounting space,
4. the additional mounting space permits an optimal design of the coil,
5. minimal clearances between the coil 1 and the sleeve 3 cause very small air gap losses, i.e. magnetic flux losses, in consideration of assembly clearances for the compensation of tolerances, 6. maximum corrosion resistance due to overall spray-coating or encapsulation of the electronic unit on the hydraulic or pneumatic unit, weight and cost reduction by small assembly groups.

I claim:

1. An electromagnetically controlled assembly for a braking pressure control device in an anti-lock control system or traction slip control system, comprising:

electromagnetically operable valves that are mounted on a valve accommodating member, coils having electric contact elements projecting therefrom, a cover unit which covers the coils and the contact elements, at least a part of the cover unit being adapted to accommodate an electronic controller or connecting elements therefor, and a plate-shaped carrier element on which the coils are mounted and which is arranged within the cover unit, wherein then carrier element is made of a material conducting thermal flux and magnetic flux, said plate-shaped carrier element including a plurality of sleeves and tubular members conducting magnetic flux and thermal flux, each being parts used for a magnetic circuit of the valves, and arranged on the bottom side of the carrier element facing the coils, the sleeves and tubular members being directly connected to the carrier element and adapted to be in operative engagement with a plurality of valve domes which conduct the thermal flux and accommodate the coils, wherein a plurality of parts conducting thermal flux are mounted on the top side of the plate-shaped carrier element remote from the coils, and wherein the valve domes, the sleeves, the tubular members and the carrier element are made of steel, and the valve accommodating member which accommodates the valves is made of light metal.

2. The electromagnetically controlled assembly as claimed in claim 1, wherein each sleeve is configured as a tubular member which encompasses a respective coil.

3. The electromagnetically controlled assembly as claimed in claim 1, wherein separately of each sleeve, tubular members are in abutment on the carrier element, each of the tubular members encompassing the respective coil.

4. The electromagnetically controlled assembly as claimed in claim 3, wherein each tubular member is retained on the carrier element in operative engagement therewith.

5. The electromagnetically controlled assembly as claimed in claim 1, wherein each sleeve has a bowl shape, and the open bowl end is slipped over the valve dome.

6. The electromagnetically controlled assembly as claimed in claim 1, wherein each sleeve is radially displaceable with respect to each coil.

7. The electromagnetically controlled assembly as claimed in claim 1, wherein one of the parts conducting the thermal flux is a heat conducting foil mounted on the top side of the carrier element remote from the coils, and electric or electronic components are arranged on the heat conducting foil.

8. The electromagnetically controlled assembly as claimed in claim 1, wherein the sleeves are radially displaceable along the bottom side of the carrier element, the bottom side facing the coils.

* * * * *